No. 854,652. PATENTED MAY 21, 1907.
W. J. KINNEY.
WIND WHEEL.
APPLICATION FILED DEC. 3, 1906.

3 SHEETS—SHEET 1.

Witnesses.
Inventor:

No. 854,652. PATENTED MAY 21, 1907.
W. J. KINNEY.
WIND WHEEL.
APPLICATION FILED DEC. 3, 1906.

3 SHEETS—SHEET 2.

Witnesses.
H. L. Trimble
P. A. Bateman

Figure 2:
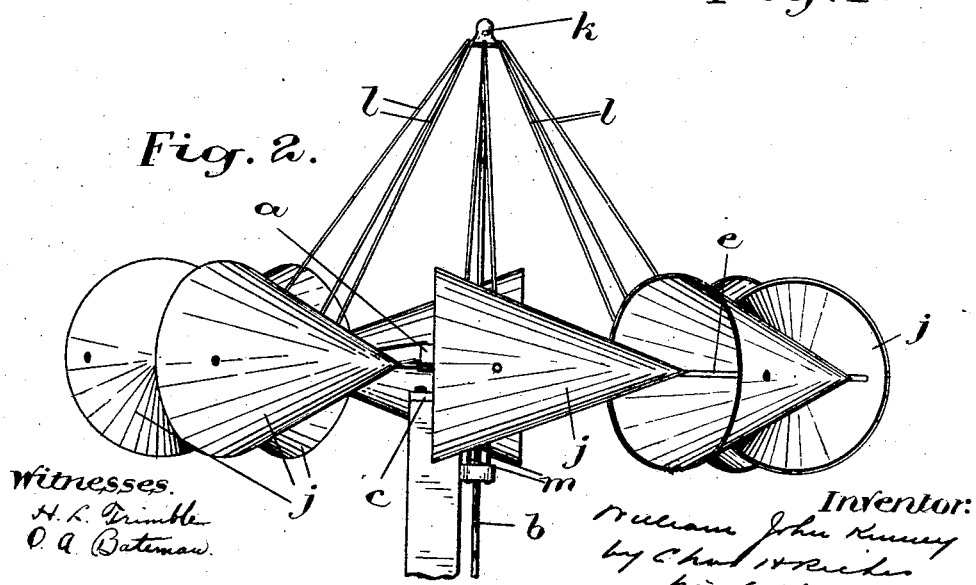

Inventor.
William John Kinney
by Chas. H. Rieder
his attorney.

ced by the wind. Fig. 2, is a side eleva-
UNITED STATES PATENT OFFICE.

WILLIAM J. KINNEY, OF SEAFORTH, ONTARIO, CANADA.

WIND-WHEEL.

No. 854,652.        Specification of Letters Patent.        Patented May 21, 1907.

Application filed December 3, 1906. Serial No. 346,182.

*To all whom it may concern:*

Be it known that I, WILLIAM JAMES KINNEY, of the town of Seaforth, in the county of Huron and Province of Ontario, Canada, have invented certain new and useful Improvements in Wind-Wheels; and I hereby declare that the following is a full, clear, and exact description of the same.

This invention relates to a wind wheel having a series of wind cups connected to horizontal rocker arms radiating from a central hub, and an actuating means for the rocker arms to position the wind cups to be influenced by the wind or to be uninfluenced thereby as hereinafter set forth and more particularly pointed out in the appended claims.

Figure 1:
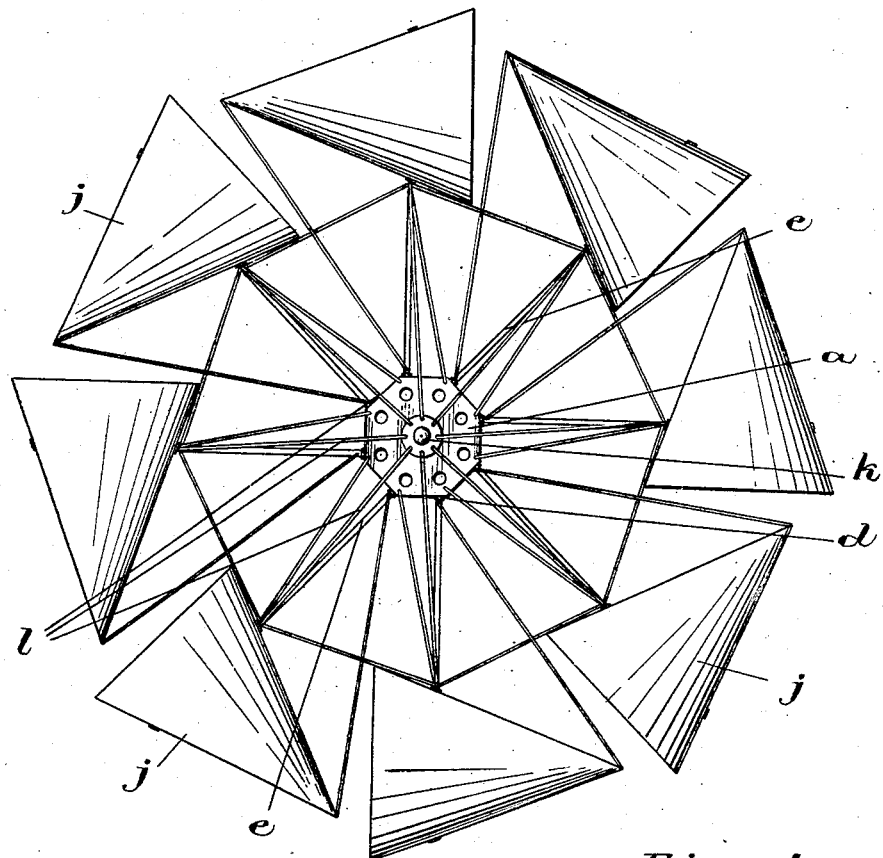
Figure 3:
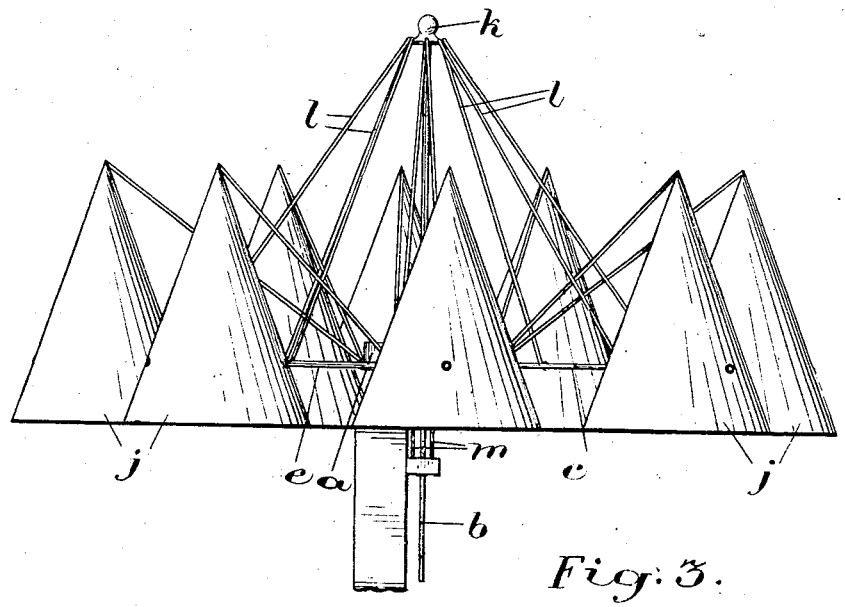
Figure 7:
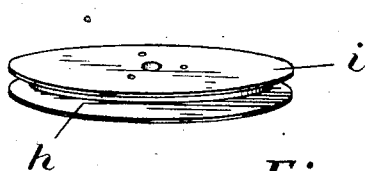
Figure 6:
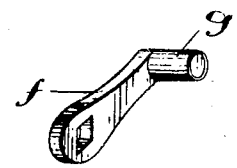
Figure 5:
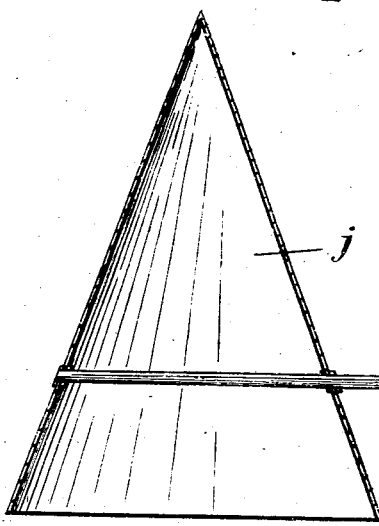
Figure 5:
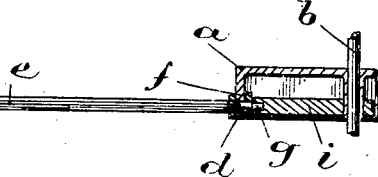
Figure 4:
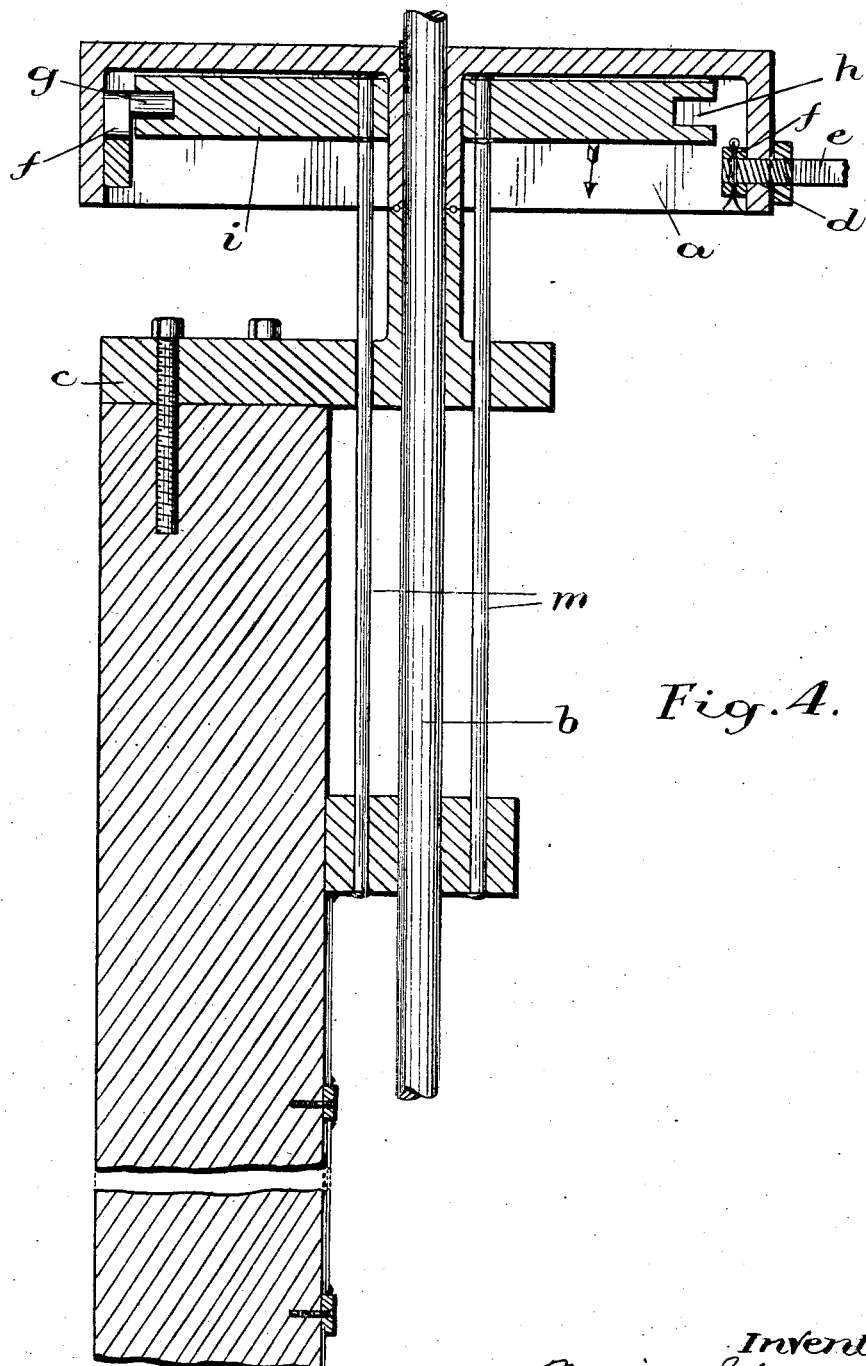

In the drawings,—Figure 1, is a plan view of the wind wheel looking at it from the top showing the wind cups positioned to be influenced by the wind. Fig. 2, is a side elevation of the wind wheel showing the wind cups in the same position as Fig. 1. Fig. 3, is a side elevation showing the wind cups positioned to be uninfluenced by the wind. Fig. 4, is a vertical section through the hub of the wind wheel showing the means for actuating the rocker arms to position the wind cups. Fig. 5, is a sectional view of one of the wind cups, its rocker arm, and a part of the hub. Fig. 6, is a perspective view of the crank of one of the rocker arms, and, Fig. 7, is a detail view of the sliding disk for the cranks.

Like characters of reference refer to like parts throughout the specification and drawings.

The wind wheel shown in the accompanying drawings consists of an inverted cup shaped hub part $a$, having a central shaft $b$ journaled in suitable bearings forming part of the supporting structure $c$. In the rim of the hub part $a$ are a series of apertures $d$ for the rocker arms $e$ of the wind cups. The inner ends of the rocker arms $e$ project through the rim of the hub part $a$, and are fitted within the rim with cranks $f$, having crank pins $g$ engaging in the peripheral channel $h$ of the sliding disk $i$. The sliding disk is non-revoluble within the hub part and the crank pins travel in the peripheral groove during the revolution of the hub part. Rigidly fixed to the outer end of each rocker arm $e$ is a wind cup $j$ which moves with the rocker arm when the latter is actuated by the sliding disk, as hereinafter described.

The central shaft $b$ projects above the hub part $a$ and is fitted with a head $k$, for the stay rods $l$ which support the outer ends of the rocker arms. The head $k$ is rigidly fixed to the central shaft $b$ and the inner ends of the stay rods $l$ are rigidly connected to the head $k$, while their outer ends embrace the rocker arms and hold them securely in position without retarding their rocking movement.

The sliding disk $i$ is vertically movable on the central shaft $b$, and the crank pins $g$ are constantly within the peripheral channel $h$ and sensitive to any movement of the sliding disk. The sliding disk is provided with links $m$ which position it and control its sliding movement. When the sliding disk is in the position shown in Fig. 4, it sets the cranks and rocker arms to hold the wind cups in the position shown in Figs. 1 and 2. By moving the disk in the direction indicated by arrow in Fig. 4, the cranks and rocker arms are actuated to move the wind cups from the position shown in Figs. 1, and 2, to that shown in Fig. 3, to enable the wind cups and wind wheel to remain passive under the action of the wind.

When the wind wheel is erected, the wind cups can be positioned by the rocker arms, as shown in Figs 1, and 2, so that their mouths will be presented to the direction of the wind for it to enter into them and cause the revolution of the wind wheel, or they can be set as shown in Fig. 3, so that their rounded surfaces will be presented to the direction of the wind for the latter to break against them without causing the revolution of the wind wheel.

The wind cups are shown in the drawings to be of a substantially conical shape which is suitable for practical purposes owing to the area of resistance offered by the mouth ends of the wind cups to the wind when the wind cups are set in the position shown in Figs. 1, and 2, in which position the wind cups are employed to cause the revolution of the hub and the actuation of the parts influenced therefrom. The conical shape of the wind cups is also found to be advantageous by reason of the ease with which the wind breaks against them, when set in the position shown in Fig. 3, without causing any material movement of the wind wheel. The shape of the wind cups, however, is immaterial provided they have a resisting surface for the wind when set in an active position, and a rounded surface against which the wind can break without creating a movement of the wind wheel when the wind cups are set in a passive position.

Having thus fully described my invention what I claim as new and desire to secure by Letters Patent is:

A wind wheel comprising an inverted cup shaped hub, a series of rocker arms projecting from the hub, cranks for the inner ends of the rocker arms, a disk slidable within the hub and peripherally grooved to receive the cranks, means for positioning said disk, wind cups at the outer ends of the rocker arms positioned by the actuation of the disk, a shaft for the hub, a head for the shaft and stay rods connected to the head supporting the rocker arms.

Toronto, November 8th, 1906.

WILLIAM J. KINNEY.

Signed in the presence of:
  CHAS. H. RICHES,
  H. L. TRIMBLE.